United States Patent
Liedtke et al.

(10) Patent No.: US 6,246,354 B1
(45) Date of Patent: Jun. 12, 2001

(54) METHOD OF DETERMINING OF PERMITTIVITY OF CONCRETE AND USE OF THE METHOD

(75) Inventors: Stefan Liedtke, Rankweil; Stefan Tichy, Vienna, both of (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/414,194

(22) Filed: Oct. 7, 1999

(30) Foreign Application Priority Data

Oct. 15, 1998 (DE) .............................................. 198 61 055
Oct. 15, 1998 (DE) .............................................. 198 47 688
Apr. 1, 1999 (DE) ............................................ 199 15 017

(51) Int. Cl.$^7$ ...................................................... G01V 3/12
(52) U.S. Cl. ............................................ 342/22; 342/196
(58) Field of Search ............................. 342/22, 192, 193, 342/194, 195, 196

(56) References Cited

U.S. PATENT DOCUMENTS 5,420,589 * 5/1995 Wells et al. ............................. 342/22
5,952,561 * 9/1999 Jaselskis et al. .......................... 73/78

FOREIGN PATENT DOCUMENTS

3132573A * 3/1983 (DE) .

OTHER PUBLICATIONS

"Multitarget detection/tracking for monostatic ground penetrating radar: application to pavement profiling", Spagnolini, U.; Rampa, V., Geoscience and Remote Sensing, IEEE Transactions on, vol.: 37 Issue: 1 Part: 2, Jan. 1999, pp.: 383–394.*

* cited by examiner

Primary Examiner—John B. Sotomayor
(74) Attorney, Agent, or Firm—Brown & Wood, LLP

(57) ABSTRACT

A method of determining a relative permittivity ($\epsilon_r$) of concrete including providing a radar apparatus to be positioned on a concrete mass and having a transmitting antenna (2) for emitting a radar wave into the concrete mass and a receiving antenna (3) for detecting a cross-signal generated by the radar wave emitted into the concrete mass by the transmitting antenna, electronically processing the cross-signal, and determining the relative permittivity ($\epsilon_r$) by determining, with an algorithm, a frequency-dependent amplitude shifting in a spectrum of a signal section with in a predetermined time slot ($t_1$); and using the so determined permittivitiy for depth scaling and determining presence of foreign bodies.

11 Claims, 4 Drawing Sheets

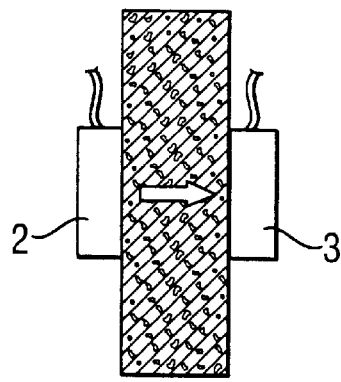
Fig.1a
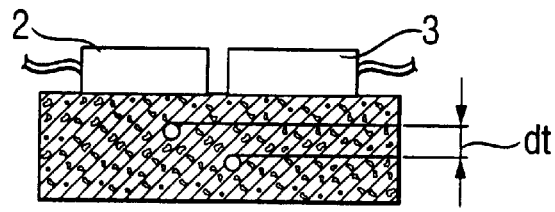
Fig.1b
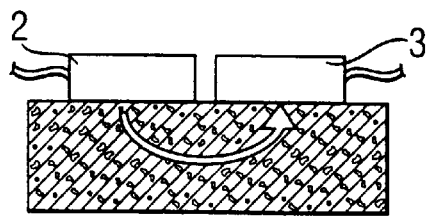
Fig.1c
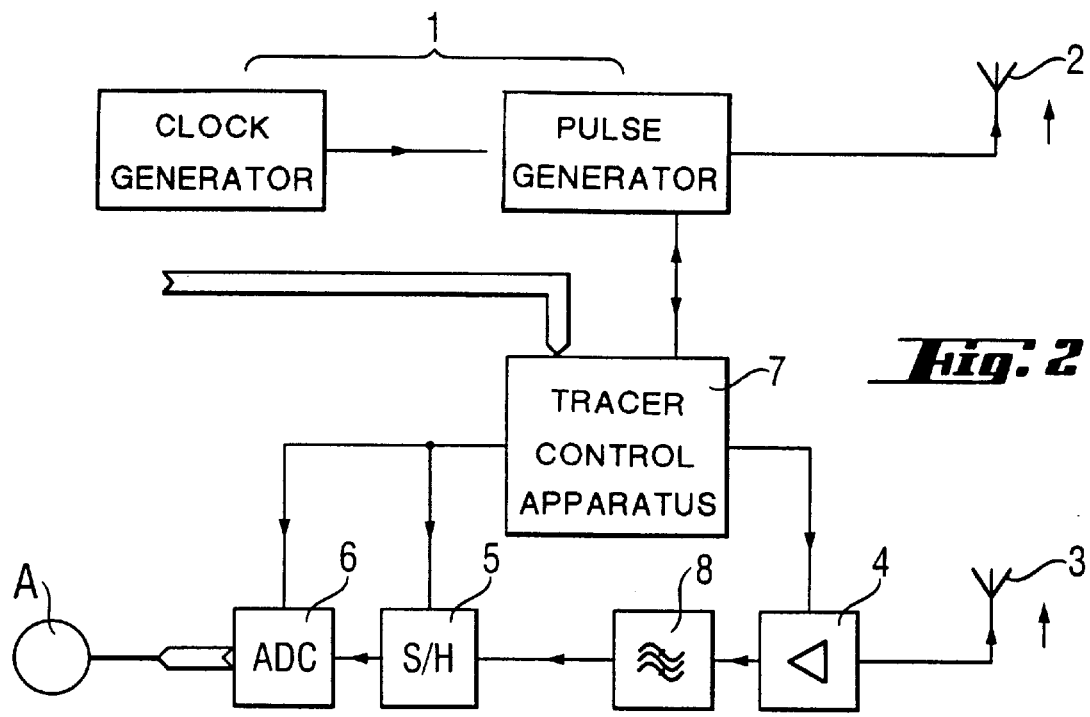

METHOD OF DETERMINING OF PERMITTIVITY OF CONCRETE AND USE OF THE METHOD

BACKGROUND OF THE INVENTOR

1. Field of the Invention

The present invention relates to a method of determining a relative permittivity of concrete, in particular in dependence on its moisture content and according to which a radar wave is emitted into a concrete mass, and a reflected radar signal, which is generated in the concrete mass and, in particular, from foreign bodies contained in the concrete mass, is electronically processed and is subjected to an evaluation. The present invention also relates to use of the method of determining of the permittivity for depth scaling of the radar data, in particular, for determining presence of foreign bodies in the used constructional material with an electromagnetic sensor.

2. Description of the Prior Act

In the field of non-destructive material testing in the microwave frequency region, different methods of determining of the permittivity of an inspected medium are known. In this field, the inspection of concrete dependent on its composition and/or moisture content is of a particular interest.

In the article of Bungey et al. "The influence of concrete composition upon radar test results," "Non-Destructive Testing in Civil Engineering," The British Institute of Non-Destructive Testing, INSINT, vol. 39, No. 7, 1997, pp. 4874–478 (Bungey) among others, determination of dielectric properties of concrete by laboratory measurements is described. To this end, preliminary prepared concrete samples are placed inside of a large volume microwave conduit oncluded at one end with a predetermined load resistance, and their permittivities or dielectric constants and conductivities arc determined.

In the article of Padartz, et al., "Coupling Effects of Radar Antennae on Concrete", Non-Destructive Testing in Civil Engineering, The British Institute of Non-Destructive Testing, NDT-CE '97, vol. 1, pp. 237–245 (Padartz), placing of plate-shaped concrete samples between a radar transmitter and a radar receiver (please see FIG. 1a) and the determination of the propagation or the frequency-dependent shifting of a spectral density of a receiving signal are described.

Determination of an appropriate moisture content on an inspected bottom surface with GPR (Ground Penetrating Radar) during geodesic works is described in an article of Berktold et al., "Subsurface Moisture Determination With the Ground Wave of GPR", R. G. Plumb GPR '98, University of Kansas (Berktold). Here, the difference in propagation of reflections of an emitted radar wave from two known reflectors located at different depths (please see FIG. 1b) is evaluated with an algorithm.

Finally, a method of an iterative migration according to which a determined value of a dielectric constant or permittivity $\epsilon_r$ is obtained with a focused migrated profile of recorded radar data is described in an article of Fisher et al., "Examples of Reverse-Time Migration of Single-Channel, Ground-penetrating Radar Profiles", Geophysics, vol. 57, No. 4, 1992, pp. 577–586.

However, the use of the known methods for the determination of the moisture content by determining a relative permittivity in practice, e.g., on a constructional site, is connected with certain difficulties. This is because additional measurements are required, which is associated with increased costs, or as, e.g., with the method described in Berktold, the knowledge of the structure or the texture or the surface layer is required. With the method of Padaratz, a two-side access to the inspected samples for the transmission measurement is needed.

Accordingly, an object of the present invention is to provide a method of determining the constitution and/or the moisture content of concrete by determining the relative permittivity of the concrete which would not require any preliminary knowledge about the inspected material, provision of samples and/or additional separate measurements.

SUMMARY OF THE INVENTION

This and other objects of the present invention, which will become apparent hereinafter, are achieved by providing a method including providing a radar apparatus to be positioned on a concrete mass and having a transmitting antenna for emitting a radar wave into the concrete mass and a receiving antenna for detecting a cross-signal generated by the radar wave emitted into the concrete mass by the transmitting antenna, electronically processing the cross-signal, and determining the relative permittivity by determining, with an algorithm, a frequency-dependent amplitude shifting in a spectrum of a section of the cross-signal within a predetermined time slot.

The present invention proceeds from a basic idea that it should be possible to emit, with an electromagnetic sensor properly positioned, a radar pulse into a predetermined medium, in particular, concrete via a transmitting antenna, and to obtain a satisfactory information about the permittivity of the inspected medium only from a cross-signal detected by a receiving antenna, which is spaced from the transmitting antenna, with the cross-signal being generated by the radar wave emitted by the transmitting antenna.

It was particularly important to develop a method and a sensor for detecting foreign bodies in the constructional material, in particular, in concrete. E.g., if fissures were formed in a concrete wall by a drilling hammer, it is, of course, important to determine at what depth from the surface, e.g., of a concrete wall, possible foreign bodies, e.g., reinforced steel, tubular conduits, and the like are located. If a radar measurement is used, in order to be able to effect a depth scaling of the available radar data, it is important to know the propagation velocity of the electromagnetic waves in the inspected medium. This velocity is determined from an equation $$V = \frac{Co}{\sqrt{\varepsilon r}},$$

where Ps $\epsilon_r$ is determined by the method according to the present invention, and Co is the speed of light in the air, i.e., Co=3.10$^8$ m/sec. Together with the determination of the time (t) of propagation, the depth (s) at which the foreign body is located in the concrete wall beneath its limiting surface in the region of a possible fissure or in the surface region covered by the electromagnetic sensor, is determined from the equation $$s=vt$$

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments when read with reference to the accompanying drawings.

BRIEF DESCRIPTION OF THE DRAWINGS

In the Drawings:

FIG. 1a shows a schematic view of a known apparatus for measuring of permittivity of concrete;

FIG. 1b shows a schematic view of another known apparatus for measuring the permittivity of concrete;

FIG. 1c shows a schematic view of an impulse radar apparatus for measuring the permittivity of concrete according to the present invention;

FIG. 2 shows a principle diagram of a hardware of an impulse radar apparatus for measuring or the permittivity or for detecting of foreign bodies in an inspected medium, in particular, in concrete;

DETAILED DESCRIPTION OF THE PREFERRED EMBODIMENT

Figure 3:
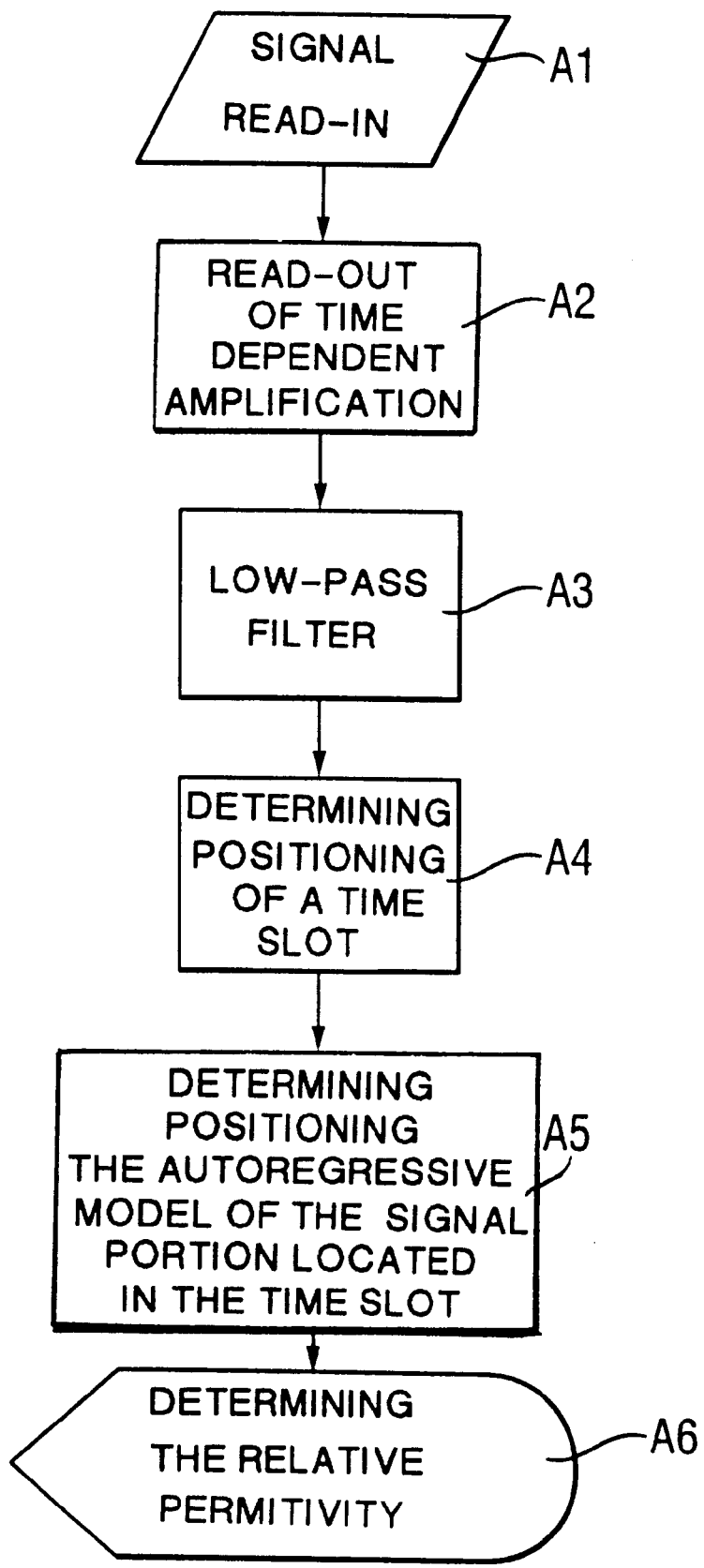
FIG. 3 shows a flow chart illustrating the determination of a relative permittivity.

FIG. 1c shows an impulse radar apparatus including a transmitting antenna 2 and a receiving antenna 3 which are located, preferably as a unit, in a common housing which is placed on a surface of a concrete mass. In radar apparatuses such as shown in FIG. 1c with separate transmitter and receiver units, a short cross-signal is transmitted from the transmitting antenna 2 to the receiving antenna 3 upon emission of waves, preferably of radar pulses of a very short duration in a microwave region.

The functioning of an impulse radar apparatus, which in the same way as a stepped frequency radar is primarily used in the above-described process, will be described with reference to FIG. 2. A very short pulse having a length or duration of less than 1 ns is generated by a clock high frequency generator 1. This pulse is transmitted by the transmitting antenna 2 in a form of an electromagnetic wave into an inspected medium, e.g., concrete. The reflection or reflections in areas where the permittivity is changed, e.g., in transitional areas between concrete and reinforcing metal or between concrete and a plastic pipe is (are) picked up by the receiving antenna 3 and are amplified by a high-frequency amplifier 4 which is time controlled by a tracer control apparatus 7. A bandwidth limiting apparatus 8 converts the receiving signal in a cross-signal which is communicated to a sample and hold device 5. The cross-signal is then digitalized by an analog/digital converter and is finally communicated to a signal processing device. The entire impulse radar apparatus, i.e., the sensor apparatus or at least the transmitted antenna 2 and the receiving antenna 3 form an easily manageable unit suitable for being placed on an appropriate surface. The construction of the impulse radar apparatus, which is used in the process according to the present invention, is generally known and does not form part of the present invention.

Figure 4:
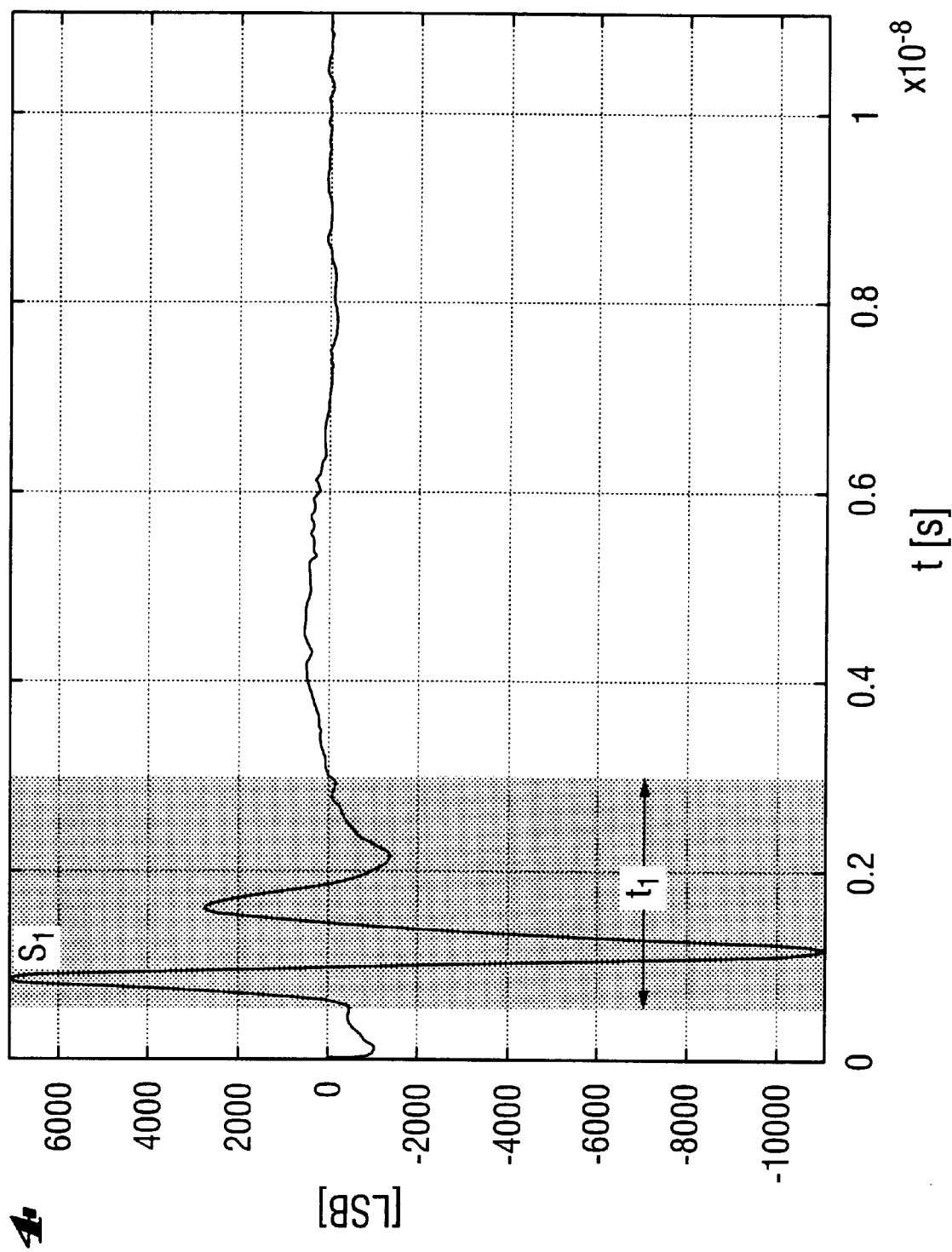
FIG. 4 shows a signal diagram illustrating a timed course of the signal strength or of a spectral power density of a cross-signal generated by an apparatus such as shown, e.g., in FIG. 1c.

FIG. 4 shows a course of the signal strength of the cross-signal dependent on the transit time and measured from the start of a pulse wave emitted by the transmitting antenna 2 during the determination of the permittivity of concrete. The characteristic region of the cross-signal is shown with dots. According to the invention, in this region, the frequency dependence is evaluated based on the moisture content of the concrete or the relative permittivity $\epsilon_r$ is calculated. It has been observed that the cross-signal propagates with the deep action in the surface of the inspected medium, i.e., concrete, and shifting of the amplitude in the frequency region can be observed, in the same way as it takes place during the transmission measurement described in Padaratz. It is known that the permittivity $\epsilon_r$ depends on the moisture content of concrete and it can, thus, be determined from a cross-signal passing through concrete.

The method of determining the permittivity of concrete according to the present invention will be described with reference to FIG. 3. In step A1, a digital signal which is obtained at an output (A) (FIG. 2) of an impulse radar apparatus, which is placed on a concrete mass, as a result of processing of a raw measuring signal, i.e., the cross-signal, is read in. Then in step A2, the time-dependent amplification is read out. The obtained signal is passed through a low-pass filter in step A3. Then, in step A4, a timely positioning of a time slot is determined. In step A5, as it would be explained further below, an autoregressive model of a signal portion located in the time slot is determined. From this signal portion in step A6, the relative permativity Fr is determined. At that, primarily the center frequency of the cross-signal is taken in consideration because it is this frequency which is most noticeably affected by the permittivity of the inspected medium.

Figure 5:
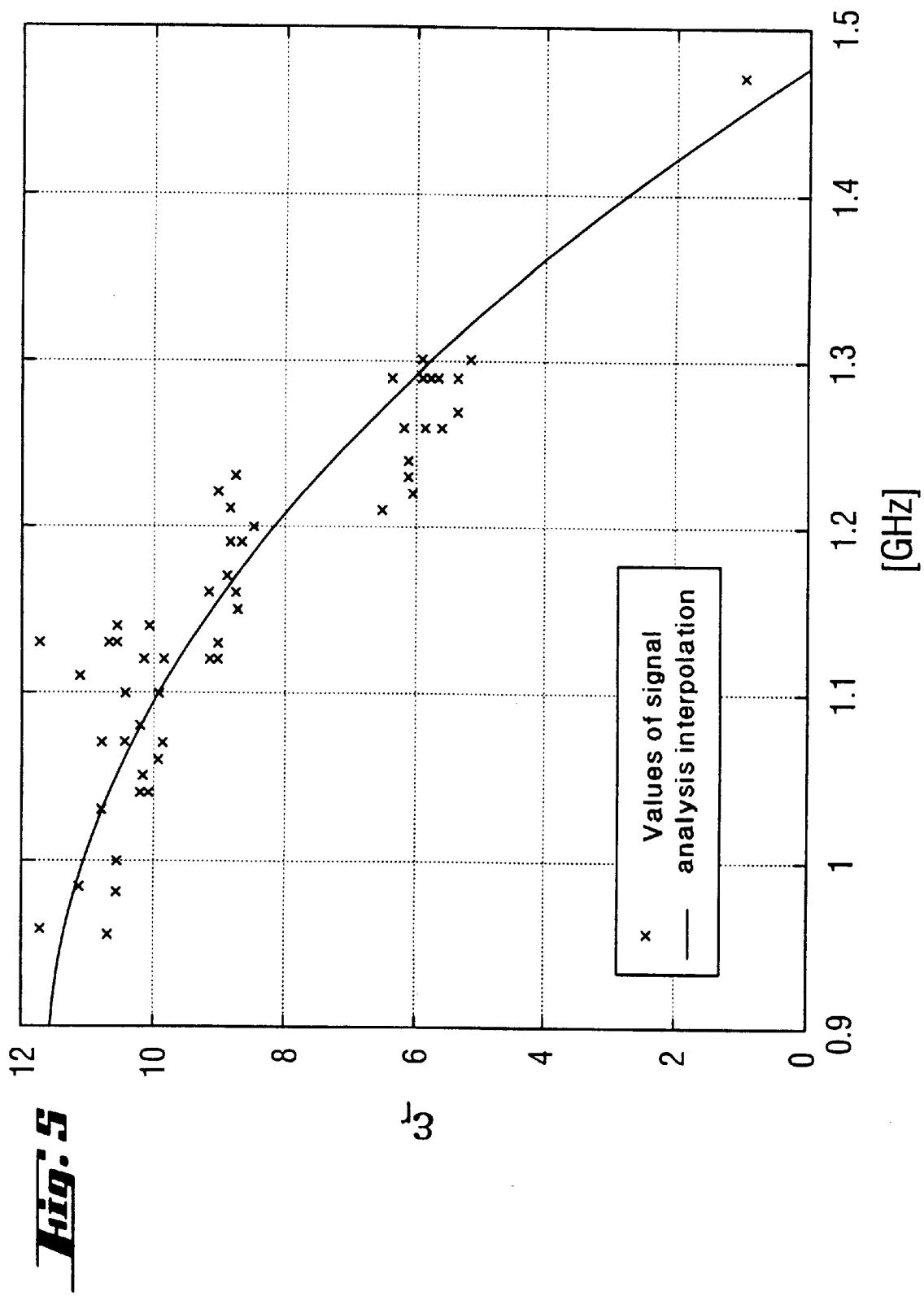
FIG. 5 shows a diagram illustrating the determination, according to the present invention, of a relative permittivity of concrete in defendence on the frequency of different amount of the moisture content.

FIG. 4 shows the results of the measurement of the permittivity of concrete. In the diagram of FIG. 4, the time domain t1 or the time slot of the obtained cross-signal is shown by gray background. For determining the time slot, a first maximum $S_1$ in the signal is determined, and the length or the duration $t_1$ of the time domain under consideration is positioned based on the maximum $S_1$. From so extracted section of the signal in the time domain, an autoregressive model (AR-model) of a lower order, in particular, of a second order $$H(z) = \frac{1}{A(z)} = \frac{1}{1 + \sum_{v=1}^{n} a_v \cdot z^{-v}} \tag{1}$$

is formed and therefrom the frequency dependence of the concrete moisture content in the surface region of concrete constructional component is extracted. As is know, the autoregressive model of the type described here relates to a parametric special estimation of a certain category of measurement signals. With an applied algorithm, the coefficient av is calculated in equation 1. The coefficient $\alpha_v$ leads to conjugated complex poles of function H(z) in the z-plane of a transformed representation of the digital signal. These poles will now be presented by the function.

$$s = \frac{\ln(z)}{T} \tag{2}$$

in the s-plane, where $s = \sigma + j\omega$ as Fourrier or Laplace transform representation of the digital discrete signal, therefrom, as can be seen in diagram of FIG. 5, each frequency value $\omega$ is singularly dependent on the moisture content of the inspected concrete.

With the applied algorithm, it if advantageous to keep the order of the AR-model as small as possible in order to save the computer time. In addition, it is desirable to select the time slot t, for the section of the cross-signal under consideration as short as possible. Thereby, additionally, the independence of possible reflections, which later can be converted into signals is obtained. For the practical use of the method according to the present invention, it is advantageous to have available a control or comparison curve stored advantageously in a look-up table. For producing such a comparison curve, a plurality of concrete samples, which covers practically the entire range of permittivities, in particular $5.15 < \epsilon_r < 11.67$, is tested. From these concrete samples only the frequency value X is determined with the aid of the above-discussed algorithm based on equations (1) and (2). The real $\epsilon_r$ values of these samples are plotted on a diagram which is shown in FIG. 5.

An interpolation with a polynom of second degree then provides a function $\epsilon_r(\omega')$ in a following form:

$$\epsilon_r = -31.2994\omega'^2 - 54.4410\omega'^1 - 12.1229 \quad (3)$$

In this polynom, $\omega'$ indicates the frequency, $\omega'$ referred to 1 $GH_Z$. With the function according to equation (3), the permittivity $E\gamma$ can be determined with a relatively high precision from a cross-signal during the inspection of concrete at a depth of its surface adequate for conventional uses, as shown in FIG. 5. "x" designates value obtained as a result of multiple measurement by signal analysis.

When the method according to the present invention is used with using an electromagnetic sensor for determining the presence of foreign bodies in the constructional materials, in particular, in concrete, the determination of the depth or scaling of the depth can be effected for the obtained radar data by a correlation analysis after the determination of the relative permittivity $E\gamma$ with the aid of the above-discussed equations. From the depth determination or scaling, finally, the determination of the characteristics of existing foreign bodies becomes possible, but this lies outside of the present invention.

Though the present invention has been shown and described with reference to a preferred embodiment, such is merely illustrative of the present invention and is not to be construed as a limitation thereof, and the present invention includes all modifications, variations and/or alternate embodiments within the spirit and scope of the present invention as defined by the appended claims.

What is claimed is:

1. A method of determining a relative permittivity ($\epsilon_r$) of concrete, comprising the steps of providing a radar apparatus to be positioned on a concrete mass and having a transmitting antenna (2) for emitting a radar wave into the concrete mass and a receiving antenna (3) for detecting a cross-signal generated by the radar wave emitted into the concrete mass by the transmitting antenna; electronically processing the cross-signal; and determining the relative permittivity ($\epsilon_r$) by determining, with an algorithm, a frequency-dependent amplitude shifting in a spectrum of a signal section within a predetermined time slot (t1).

2. A method according to claim 1, comprising the step of subjecting the cross-signal received by the receiving antenna to a time-dependent amplification and a low-pass filtration.

3. A method according to claim 2, wherein the time slot ($t_1$) is determined dependent on a time position of a first maximum ($s_1$) of a power density spectrum of the cross-signal.

4. A method according to claim 3, wherein the duration ($t_1$) of the time slot extends at least over du ration of a sequence of two maxim ($s_1, s_3$) of the cross-signal.

5. A method according to claim 1, wherein the step of determining the relative permittivity ($\epsilon_r$) includes forming, in the time domain, an autoregressive model and determining therefrom a frequency dependence of the permittivity ($\epsilon_r$) based on a moisture content of the concrete mass in a surface region of the concrete mass.

6. A method according to claim 5, wherein for a motion of an autoregressive model includes forming an autoregressive model of a second order as follows:

$$H(z) = \frac{1}{A(z)} = \frac{1}{1 + \sum_{v=1}^{n} a_v \cdot z^{-v}}$$

7. A method according to claim 6, wherein for determining of the relative permittivity ($\epsilon_r$) in dependence on the frequency, a conjugate—complex part of the function H(z) in a z-plane is determined and is transformed with a function $s = \ln(z)/T$ in a s-plane and with $s = \delta + j\omega$—by one of Fourrier and Laplace transformations, where $\sigma$ indicates an electromagnetic damping and $\omega$—the frequency.

8. A method according to claim 6, further comprising the step of forming, with reference to a reference frequency ($\omega$) for a predetermined value range of permittivities of concrete, based on a polynom of the second order, an interpolation-comparison curve for a dependency of a real value of the permittivity on the frequency.

9. A method according to claim 8, wherein for determining of the comparison curve, the reference frequency ($\omega'$) is based on 1 $GH_Z$, the value range of the permittivities is selected in a range of $5.5 \leq \epsilon_r < 11.67$, and for determination of the comparison curve the following polynom is employed:

$$E\gamma = -31.2994\omega'^{12} + 54.4410\omega'^1 - 12.1229.$$

10. A method of depth scaling of radar data in a concrete mass, comprising the steps of providing a radar apparatus to be positioned on a concrete mass and having a transmitting antenna (2) for emitting a radar wave into the concrete mass and a receiving antenna (3) for detecting a cross-signal generated by the radar wave emitted into the concrete mass by the transmitting antenna; and determining a propagation velocity of a radar wave in concrete by using an equation:

$$V = \frac{Co}{\sqrt{\varepsilon r}},$$

where

Co—is the speed of light in the air, and $\epsilon_r$—is a relative permittivity determined by determining, with an algorithm, a frequency—dependent amplitude shifting in a s plectrum of the cross-signal section established within a predetermined time slot ($t_1$).

11. A method of determining presence of foreign bodies with an electromagnetic sensor, comprising the steps of providing a radar apparatus to be positioned on a concrete mass and having a transmitting antenna (2) for emitting a radar wave into the concrete mass and a receiving antenna (3) for detecting a cross-signal generated by the radar wave emitted into the concrete mass by the transmitting antenna; determining a propagation velocity of a radar wave in concrete by using an equation $$V = \frac{Co}{\sqrt{\varepsilon r}},$$

where

Co—is the speed of light in the air, and $\varepsilon_r$—is a relative permittivity determined by determining, with an algorithm, a frequency—dependent amplitude shifting in a spectrum of the cross-signal section established within a predetermined time slot ($t_1$); and determining a depth(s) at which a foreign body is positioned from an equation s=vt, where t is propagation time.

* * * * *